United States Patent
Bishop et al.

(10) Patent No.: US 12,395,249 B2
(45) Date of Patent: Aug. 19, 2025

(54) POWER/DATA TRANSFER

(71) Applicant: BAE SYSTEMS PLC, London (GB)

(72) Inventors: Simon Bishop, Bournemouth (GB); Carl Martin Matthews, Bournemouth (GB)

(73) Assignee: BAE SYSTEMS plc, London (GB)

( * ) Notice: Subject to any disclaimer, the term of this patent is extended or adjusted under 35 U.S.C. 154(b) by 189 days.

(21) Appl. No.: 18/031,214

(22) PCT Filed: Oct. 5, 2021

(86) PCT No.: PCT/GB2021/052563
§ 371 (c)(1),
(2) Date: Apr. 11, 2023

(87) PCT Pub. No.: WO2022/079411
PCT Pub. Date: Apr. 21, 2022

(65) Prior Publication Data
US 2023/0388025 A1    Nov. 30, 2023

(30) Foreign Application Priority Data
Oct. 12, 2020  (GB) ........................... 2016130

(51) Int. Cl.
*H04B 10/80*    (2013.01)
*B64U 50/34*    (2023.01)
(Continued)

(52) U.S. Cl.
CPC ........... *H04B 10/807* (2013.01); *B64U 50/34* (2023.01); *H04B 7/18502* (2013.01); *H04B 10/112* (2013.01)

(58) Field of Classification Search
None
See application file for complete search history.

(56) References Cited

U.S. PATENT DOCUMENTS

| | | | | |
|---|---|---|---|---|
| 2005/0100339 A1* | 5/2005 | Tegge, Jr. | ............ | H04B 10/118 398/125 |
| 2005/0103943 A1* | 5/2005 | Tanielian | ............... | B64U 50/31 244/190 |

FOREIGN PATENT DOCUMENTS

| | | |
|---|---|---|
| CN | 203775217 U | 8/2014 |
| CN | 109474330 A * | 3/2019 |

(Continued)

OTHER PUBLICATIONS

Cui, Z H et al., "Key technologies of laser power transmission for in-flight UAVs recharging", 3rd International Conference on Energy Materials and Environment Engineering, IOP Publishing, IOP Conf. Series: Earth and Environmental Science (Jan. 1, 2017), vol. 61, p. 012134.

(Continued)

*Primary Examiner* — David W Lambert
(74) *Attorney, Agent, or Firm* — Scully, Scott, Murphy & Presser, P.C.

(57) ABSTRACT

According to the present disclosure there is provided a transmitter unit for providing power and data to an unmanned aerial vehicle (UAV), the transmitter unit comprising: a free-space optical transmitter configured to generate and transmit a combined free-space optical beam comprising a power beam and a data beam; and a controller for controlling generation and transmission of the combined free-space optical beam by the free-space optical transmitter. Also disclosed is a receiver unit mountable on an unmanned aerial vehicle (UAV) for receiving power and data at the UAV, the receiver unit comprising an optical receiver configured to receive at least a portion of a combined free space optical beam comprising a power beam and a data beam, the receiver unit configured to convert the received power beam (Continued)

portion into local electrical power and convert the received data beam portion into one or more data signals.

20 Claims, 5 Drawing Sheets

(51) Int. Cl.
*H04B 7/185* (2006.01)
*H04B 10/112* (2013.01)

(56) References Cited

FOREIGN PATENT DOCUMENTS

| EP | 3618309 A1 | 3/2020 | |
|---|---|---|---|
| WO | WO-2006127562 A2 * | 11/2006 | ............. H01Q 1/248 |
| WO | 2009090276 A1 | 7/2009 | |
| WO | 2020085519 A1 | 4/2020 | |

OTHER PUBLICATIONS

International Search Report dated Jan. 14, 2022 issued in PCT/GB2021/052563.
GB Search Report dated Mar. 18, 2021 issued in GB 2016130.3.

* cited by examiner

POWER/DATA TRANSFER

The present disclosure relates to a transmitter unit, receiver unit, system and method. In particular, the present disclosure relates to a transmitter unit for providing power and data to an unmanned aerial vehicle (UAV), a receiver unit mountable on a UAV for receiving power and data at the UAV, a system comprising a transmitter unit and a receiver unit and methods of providing power and data to a UAV and receiving power and data at a UAV).

BACKGROUND

Recent developments in Unmanned Aerial Vehicle (UAV) technology have led to the widespread application of UAVs across commercial, scientific, recreational and agricultural sectors.

A number of options are available for providing power to UAVs. These include battery and solar power. Whilst battery power is robust and relatively low-cost, maximum flight time of the UAV is limited by battery capacity and charge level. Solar power can provide that the UAV's energy storage device may be recharged in-flight, but is of course dependent on environmental conditions, including number of daylight hours.

Communicating with the UAV, for example, for data transmission purposes, presents additional problems. RF transmission is commonly used. However, effective RF transmission can be hindered by interference, loss of signal strength and interception of the signal.

Moreover, apparatus suitable for powering UAVs and receiving data signals at the UAV are altogether large and/or heavy.

It is an object of the present invention to provide an improved and/or method thereof and/or address one or more of the problems discussed above, or discussed elsewhere, or to at least provide an alternative system and/or method.

SUMMARY OF THE INVENTION

According to the present invention there is provided a transmitter unit, receiver unit, system and methods as set forth in the appended claims. Other features of the invention will be apparent from the dependent claims, and the description which follows.

According to a first aspect of the present invention there is provided a transmitter unit for providing power and data to an unmanned aerial vehicle (UAV), the transmitter unit comprising: a free-space optical transmitter configured to generate and transmit a combined free-space optical beam comprising a power beam and a data beam; and a controller for controlling generation and transmission of the combined free-space optical beam by the free-space optical transmitter.

In this way, power and data may be provided to a UAV whilst the UAV is in-flight. Power can be effectively transmitted via free-space optical transmitter for reception at the UAV. Moreover, data transmission via the free-space optical transmitter is robust, reliable and does not interfere with the electromagnetic compatibility (EMC) of the UAV. Free-space optical transmission, in particular laser transmission, is highly directional, allowing accurate and specific targeting of the UAV. As the free-space optical transmitter generates and transmits a combined beam, the beam can be received by a single, integrated, unit, allowing the size and weight of components mounted on the UAV to be reduced.

In one example, the combined free-space optical beam is a spatially combined free-space optical beam. That is, the power beam and data beam occupy a single region, with no spatial separation between the beams. In one example, the power beam may concentrically surround the data beam. The combined free-space optical beam may comprise a power beam of a first wavelength and a data beam of a second wavelength. The first wavelength may be longer than the second wavelength.

In one example, the free-space optical transmitter is configured to generate and transmit a combined free-space optical beam comprising a power beam of a first bandwidth, and a data beam of a second bandwidth, wherein the second bandwidth is narrower than the first bandwidth. In one example, the bandwidths are separate, non-overlapping, bandwidths.

In this way, whilst the power beam and data beam are provided in a combined beam, a first wavelength and/or bandwidth may be selected that is optimal for power beam transmission, and a second wavelength and/or bandwidth selected that is optimal for data beam transmission. The broader bandwidth of the power beam can facilitate increase in the efficiency of power transfer, whilst the narrower bandwidth of the data beam can facilitate improvement in the data signal transmission. This also can provide advantages when designing a corresponding receiver unit for receiving the combined free-space optical beam.

In one example, the free-space optical transmitter comprises one or more lasers, for example a gas laser, including a carbon dioxide laser, a solid state laser, including a Nd:YAG laser and/or a fibre laser, including a ytterbium-doped laser.

Lasers are highly directional. Moreover, transmission of power and data via laser beam is robust and does not interfere with the EMC of the UAV. Lasers can be manipulated to provide a combined laser beam comprising the power beam and data beam. That is, the combined beam can be generated and transmitted using a single laser, thus reducing the size and weight of the transmitter unit. In other examples, the power beam and data beam can be generated and transmitted using a plurality of separate lasers and combined into the combined beam. In this way, system complexity may be reduced, and improved control over the combined beam is facilitated.

According to a second aspect of the present invention there is provided a ground-based vehicle comprising a transmitter unit according to a first aspect of the present invention.

In this way, this transmitter unit can be transported and positioned to provide power and data to the UAV from an optimal location. This enables the maximum flight-time of the UAV to be increased, and a data link between the transmitter unit and the UAV to be established or maintained.

According to a third aspect of the present invention there is provided a receiver unit mountable on an unmanned aerial vehicle (UAV) for receiving power and data at the UAV, the receiver unit comprising: an optical receiver configured to receive at least a portion of a combined free-space optical beam comprising a power beam and a data beam, the receiver unit configured to convert the received power beam portion into local electrical power and convert the received data beam portion into one or more data signals.

In this way, power and data may be received at a UAV whilst the UAV is in-flight. The receiver unit being configured to receive a combined power and data beam allows power and data to be received without interfering with the EMC of surrounding electronics, including those of the UAV. Configuring the optical receiver to receive a combined beam enables the size and weight of the receiving unit to be reduced, compared to an apparatus which is configured, for example, to receive separate beams. This is because the combined beam can be received by a single, integrated, receiver unit.

In one example, the optical receiver is configured to receive at least a portion of the power beam and at least a portion of the data beam. In another example, the optical receiver is configured to receive at least a portion of the combined beam, the received portion of the combined beam comprising at least a portion of the power beam and at least a portion of the data beam. Receiving at least a portion of the beam may mean receiving a spatial portion or a temporal portion of the beam.

In one example, the receiver unit provides power directly to the UAV. In another example, the receiver unit comprises a power storage system, and the receiver unit is configured to supply the local electrical power to the power storage system. In this way, power can be stored for later use, when additional power is necessary or desirable.

In one example, the optical receiver comprises a power beam receiver arrangement and a data beam receiver arrangement. In this way, an integrated receiver unit may comprise two arrangements for performing different functions. The power beam receiver arrangement and data beam receiver arrangement may be comprised in the same unit or element, for example in a doped lens or photovoltaic array.

In one example, the optical receiver comprises a photovoltaic array comprising a plurality of power beam receiver cells and a plurality of data beam receiver cells. The power beam receiver cells may be configured to be specifically responsive to the wavelength and/or bandwidth of the power beam, and the data beam receiver cells may be configured to be specifically responsive to the wavelength and/or bandwidth of the data beam. In this way, the combined free-space optical beam can be efficiently and effectively converted into local electrical power and data signals.

In one example, the receiver unit is configured to convert the received data beam portion into a plurality of data signals, the receiver unit further comprising a processor, the processor configured to process the plurality of data signals to provide a processed data signal.

In one example, in this way the plurality of data signals may be combined to provide a stronger, more accurate, data signal. In one example, this is performed using multipath averaging. In another example, the plurality of data signals can be independently processed to provide a plurality of processed data signals. This may be particularly effective where multiple data signals are transmitted on the same data beam portion, and the plurality of data signals can be extracted from the single data beam and processed into a plurality of data signals. This may be referred to as optical frequency-division multiplexing.

In one example, the optical receiver comprises a lens arrangement comprising one or more doped lenses, the doped lenses of the lens arrangement being optionally adjustable to adjust the angle of an optical axis of one or more of the doped lenses relative to the free-space optical beam.

In this way, the power beam receiver arrangement and data beam receiver arrangement is providable in a single lens, by appropriate doping of the lens to tune it to the wavelengths and/or bandwidths of the power beam portion and data beam portion of the combined free-space optical beam. Moreover, an adjustable lens allows the lens to be adjusted for optimal reception of the combined free-space optical beam.

According to a fourth aspect of the present invention there is provided a UAV comprising a receiver unit according to the third aspect of the present invention. In this way, maximum flight-time of the UAV, and improved control and data link with the ground, is facilitated, as power and data can be received by the UAV in-flight.

The terms unmanned aerial vehicle (UAV) and drone may be used interchangeably. The UAV may be a hand-held UAV (maximum altitude 600 m, maximum range 2 km), a close UAV (maximum altitude 1500 m, maximum range 10 km), a NATO type UAV (maximum altitude 3000 m, maximum range 50 km), a tactical UAV (maximum altitude 5500 m, maximum range 160 km), a medium altitude long endurance (MALE) UAV (maximum altitude 9000 m, range over 200 km), a high altitude long endurance (HALE) UAV (altitude above 9100 m, indefinite range). The UAV may be a HALE UAV.

According to a fifth aspect of the present invention there is provided a system comprising a transmitter unit according to the first aspect of the present invention or a ground-based vehicle according to the second aspect of the present invention and a receiver unit according to the third aspect of the present invention or a UAV according to the fourth aspect of the present invention.

In one example, the transmitter unit is a first transmitter unit and the receiver unit is a first receiver unit, the system further comprising: a second transmitter unit mountable on the UAV, the second transmitter unit comprising a transmitter configured to generate and transmit an air-to-ground signal; and a second receiver unit, the second receiver unit comprising a receiver configured to receive at least a portion of the air-to-ground signal from the second transmitter unit.

In one example, the second transmitter unit is configured to transmit an air-to-ground signal comprising one or more of: information relating to a power storage system mountable on the UAV to store the local electrical power, for example information relating to a charge level of the power storage system; network management data; and/or telemetry data. Network management data may relate to current users of the system, for example parties communicating with the UAV (by transmitting thereto or receiving therefrom), throughput capacity of the system and current usage levels. Telemetry data may comprise system and/or UAV platform or payload specific ancillary data. In this way, improved communication between the ground and UAV is facilitated. For example, a data link may be established from the UAV to the ground allowing the collection of telemetry data, location information, and instrumentation status information, such as component health and power storage level. The second transmitter unit may be a radio transmitter, and the second receiver unit may be an RF receiver. In this way, communication from air to ground can be relatively low power, and long-range communication is facilitated. Of course, the second transmitter unit may be a transmitter unit according to the first aspect of the invention.

According to a sixth aspect of the present invention there is provided a method of providing power and data to an unmanned aerial vehicle (UAV), the method comprising: generating and transmitting, via a free-space optical transmitter, a combined free-space optical beam comprising a power beam and a data beam.

According to a seventh aspect of the present invention there is provided a method of receiving power and data at an unmanned aerial vehicle (UAV), the method comprising: receiving, at an optical receiver, at least a portion of a combined free-space optical beam comprising a power beam and a data beam; and converting the received power beam portion into local electrical power; and converting the received data beam portion into one or more data signals.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 1:
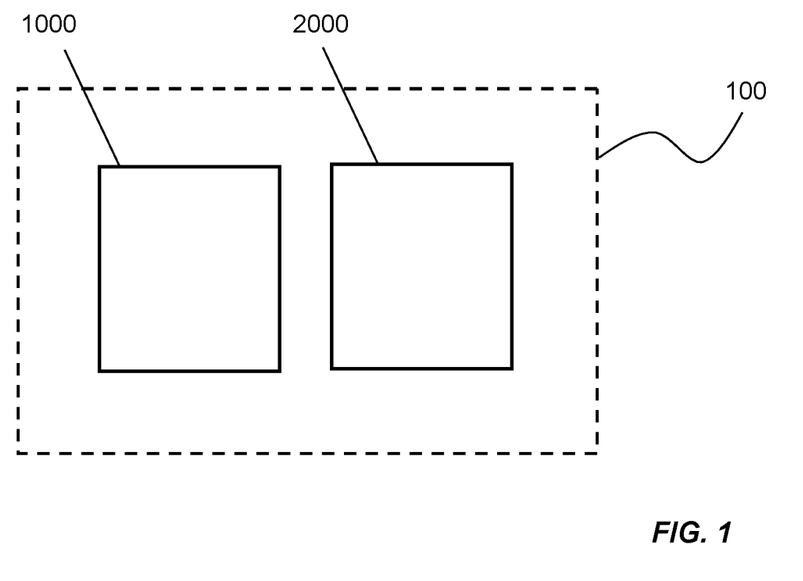
FIG. 1 shows a system comprising a transmitter unit and a receiver unit.

Referring to FIG. 1, a system 100 comprising a transmitter unit 1000 and a receiver unit 2000 is shown.

Figure 2:
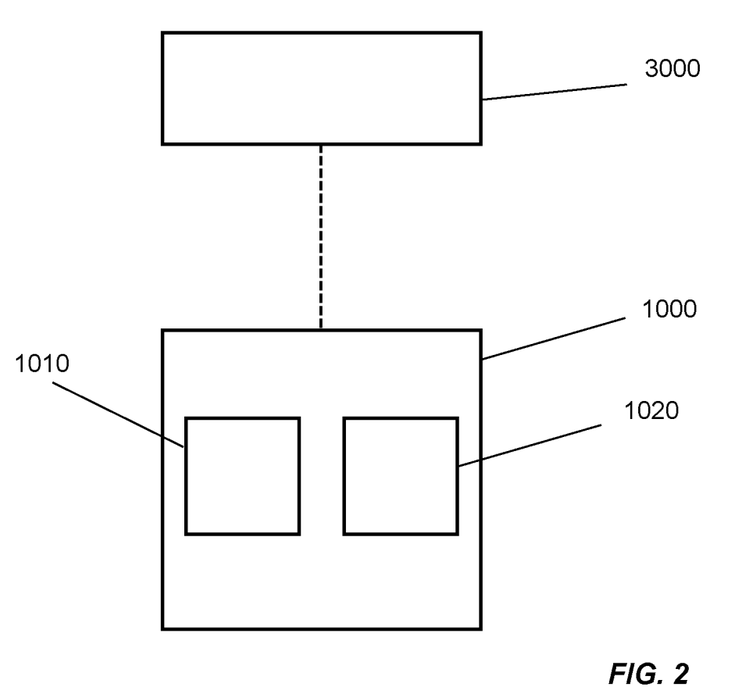
FIG. 2 shows a transmitter unit.

The transmitter unit 1000 is shown in greater detail in FIG. 2. The transmitter unit 1000 is for providing power and data to an unmanned aerial vehicle (UAV) 3000. The transmitter unit 1000 comprises a free-space optical transmitter 1010. The free-space optical transmitter 1010 is configured to generate and transmit a combined free-space optical beam comprising a power beam and a data beam. The transmitter unit 1000 further comprises a controller 1020 for controlling transmission of the combined free-space optical beam by the free-space optical transmitter 1010.

Figure 3:
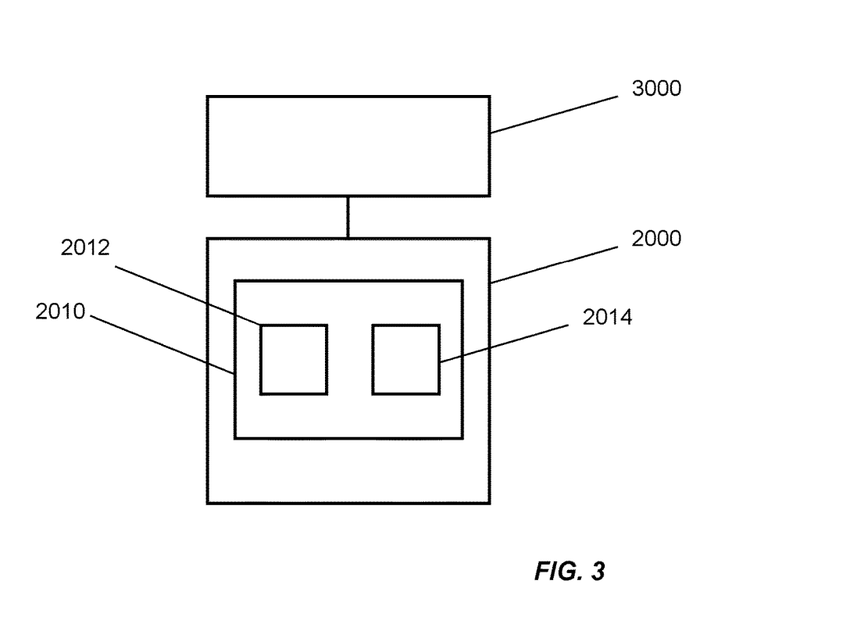
FIG. 3 shows a receiver unit.

The receiver unit 2000 is shown in greater detail in FIG. 3. The receiver unit 2000 is mountable on a UAV. The receiver unit 2000 is for receiving power and data at a UAV. In this exemplary embodiment, the UAV is the UAV 3000 to which power and data may be provided by the transmitter unit 1000. The receiver unit comprises an optical receiver 2010 configured to receive at least a portion of a combined free space optical beam comprising a power beam and a data beam. The receiver unit 2000 is configured to convert the received power beam portion into local electrical power and convert the received data beam portion into one or more data signals.

Figure 4A:
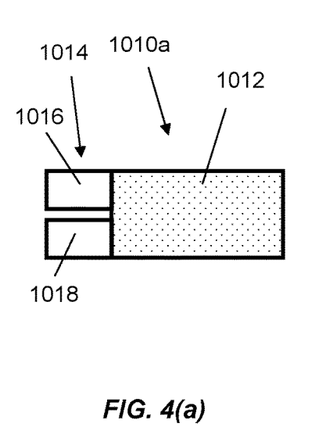
FIGS. 4(a)-(c) show exemplary configurations of a free-space optical transmitter.
Figure 4B:
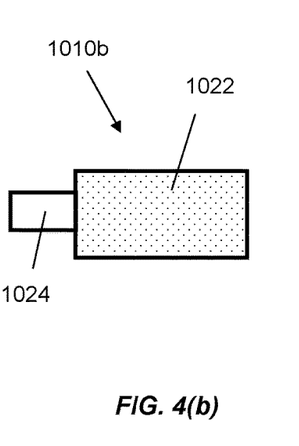
Figure 4C:
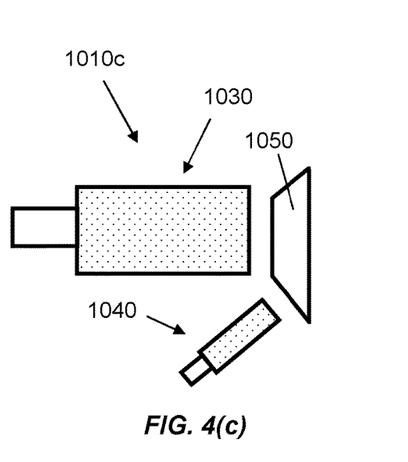

Referring back to FIG. 2, the free-space optical transmitter 1010 is configured to generate and transmit a combined free-space optical beam comprising a power beam of a first bandwidth, and a data beam of a second bandwidth. The second bandwidth is narrower than the first bandwidth. Exemplary configurations of the free-space optical transmitter 1010 are shown in FIGS. 4(a)-(c). The person skilled in the art will appreciate that alternative configurations may be suitable to generate and transmit the combined free-space optical beam.

In the exemplary embodiment illustrated in FIG. 4(a), the free-space optical transmitter 1010a is a laser comprising a gain medium 1012 and a plurality of excitation diodes 1014 for exciting the medium. The plurality of excitation diodes 1014 comprise a power diode 1016 and a data diode 1018. The power diode 1016 and data diode 1018 are operable at distinct frequencies, and thereby induce characteristic excitations of the gain medium 1012. In this way, a combined beam may be generated by the free-space optical transmitter 1010a comprising a power beam and a data beam.

In the exemplary embodiment illustrated in FIG. 4(b), the free-space optical transmitter 1010b is a tuneable laser comprising a gain medium 1022 of adjustable composition and an excitation diode 1024. The laser frequency is adjustable by adjusting the composition of the gain medium 1022 during excitation of the gain medium 1022 by the excitation diode 1024. In this way, a combined beam may be generated by the free-space optical transmitter 1010b comprising a power beam and a data beam.

In the exemplary embodiment illustrated in FIG. 4(c), the free-space optical transmitter 1010c comprises a power beam transmitter 1030 and a data beam transmitter 1040. In this exemplary embodiment, the power beam transmitter 1030 and data beam transmitter 1040 are lasers operating at different bandwidths. The free-space optical transmitter 1010c further comprises a beam steering element, which in this exemplary embodiment is a prism 1050. The prism 1050 combines the power beam generated and transmitted by the power beam transmitter 1030 with the data beam generated and transmitted by the data beam transmitter 1040 to form a combined free-space optical beam comprising a power beam and a data beam.

Figure 5:
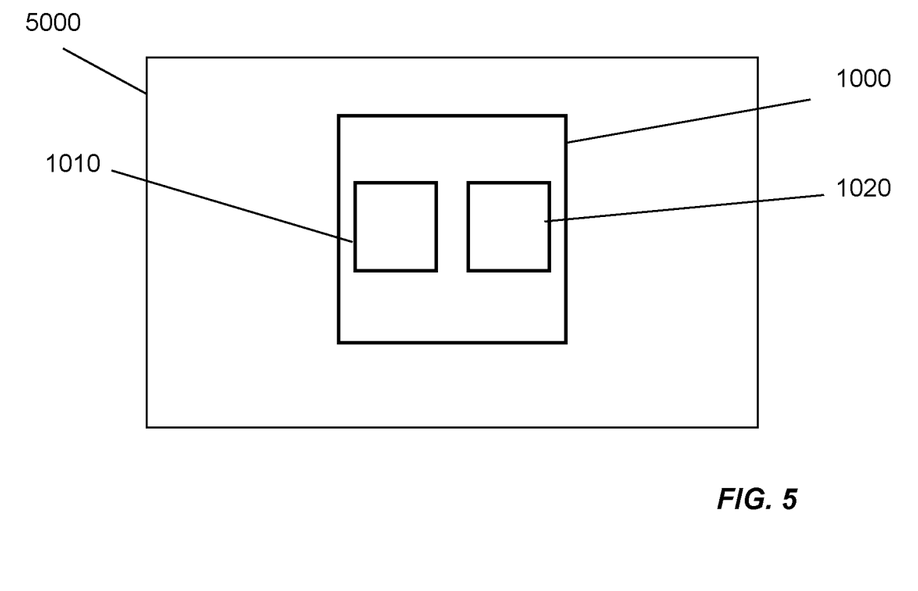
FIG. 5 shows a ground-based vehicle comprising a transmitter unit.

Referring to FIG. 5, the transmitter unit 1000 is shown mounted on a ground-based vehicle 5000. In this way, the transmitter unit 1000 can be transported and positioned to provide power and data to the UAV 3000 from an optimal location.

Figure 6A:
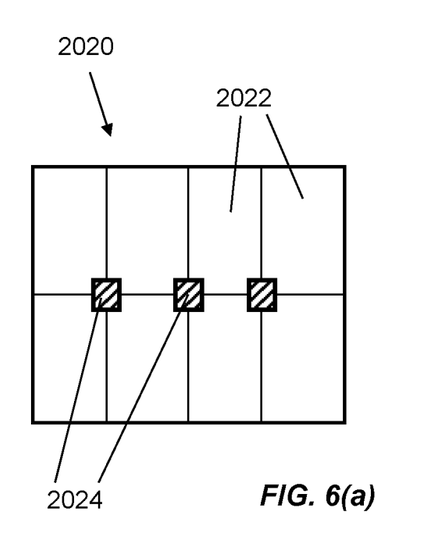
FIGS. 6(a) and (b) show exemplary configurations of an optical receiver.
Figure 6B:
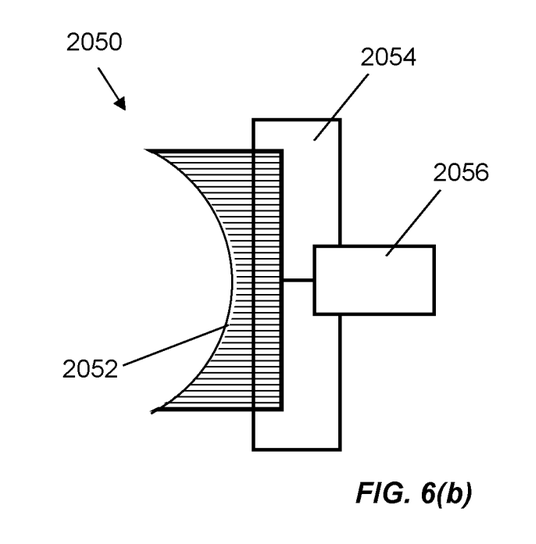

Referring back to FIG. 3, the optical receiver 2010 comprises a power beam receiver arrangement 2012 and a data beam receiver arrangement 2014. Exemplary configurations of the optical receiver 2010 are shown in FIGS. 6(a)-(b). The person skilled in the art will appreciate that alternative configurations may be suitable to receiver at least a portion of a combined free-space optical beam.

In the exemplary embodiment illustrated in FIG. 6(a), the optical receiver 2010a comprises a photovoltaic array 2020 comprising a plurality of power beam receiver cells 2022 and a plurality of data beam receiver cells 2024. The power beam receiver cells 2022 form the power beam receiver arrangement 2012 and the data beam receiver cells 2024 form the data beam receiver arrangement 2014. The power beam receiver cells 2022 are larger in size than the data beam receiver cells 2024. The power beam receiver cells 2022 are responsive to a broad bandwidth of incident radiation, which is achievable by techniques well understood in the art, such as material doping. The data beam receiver cells 2024 are responsive to a narrower bandwidth of incident radiation.

The optical receiver 2010 is thereby operable to receive a data beam portion and convert the received data beam portion into a plurality of data signals. The optical receiver 2010 further comprises a processor 2030. The processor 2030 is configured to process the plurality of data signals to provide a processed data signal, which in this exemplary embodiment is a single data signal which can be provided to the UAV, or to a controller or memory provided thereon.

In the exemplary embodiment illustrated in FIG. 6(b), the optical receiver 2010b comprises a lens arrangement 2050. The lens arrangement comprises a doped lens 2052. The doped lens 2052 is responsive to a first bandwidth of incident radiation to output a first electrical signal and is responsive to a second bandwidth of incident radiation to output a second electrical signal. The doped lens 2052 is in communication with a power harvesting assembly 2054 and a data receiver 2056. That is, the doped lens 2052 and power harvesting assembly 2054 form the power beam receiver arrangement 2012, and the doped lens 2052 and data receiver 2056 form the data beam receiver arrangement 2014.

The power harvesting assembly 2054 is configured to receive the first electrical signal and harvest it for use as local electrical power, and the data receiver 2056 is configured to receive the second electrical signal for use as a data signal. The lens arrangement 2050 is adjustable to adjust the angle of the optical axis of the doped lens relative to the free-space optical beam, so that the angle of incidence of the beam can be optimised for reception of the beam.

In the exemplary embodiments described above, the power beam receiver arrangement 2012, comprising power beam receiver cells 2022 or doped lens 2052 and power harvesting assembly 2054, is designed to be optimally responsive across the bandwidth of the power beam generated and transmitted by the free-space optical transmitter 1010. Similarly, the data beam receiver arrangement 2014, comprising data beam receiver cells 2024 or doped lens 2052 and data receiver 2056 is designed to be optimally responsive across the bandwidth of the data beam generated and transmitted by the free-space optical transmitter 1010.

Figure 7:
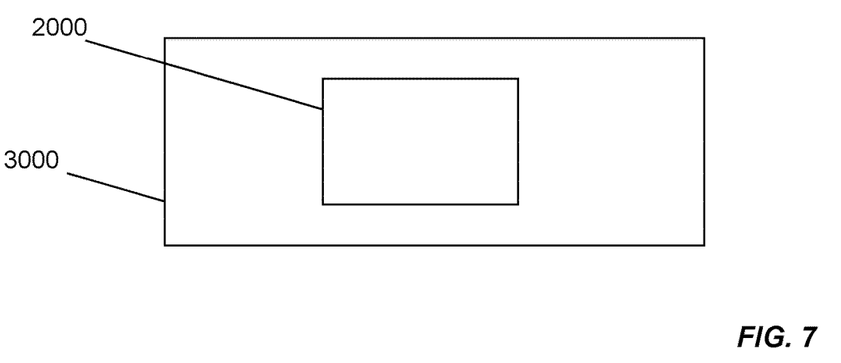
FIG. 7 shows a UAV comprising a receiver unit.

Referring to FIG. 7, the receiver unit 2000 is shown mounted on a UAV 3000. In this way, power and data can be received at the UAV in-flight, thus extending the UAVs maximum flight time.

The system 100 comprises a transmitter unit 1000 and receiver unit 2000 of an exemplary embodiment as described above. In an exemplary embodiment of the system 100, the system 100 comprises the ground-based vehicle 5000 on which the transmitter unit 1000 is mounted and further comprises the UAV 3000 on which the receiver unit 2000 is mounted.

Figure 8:
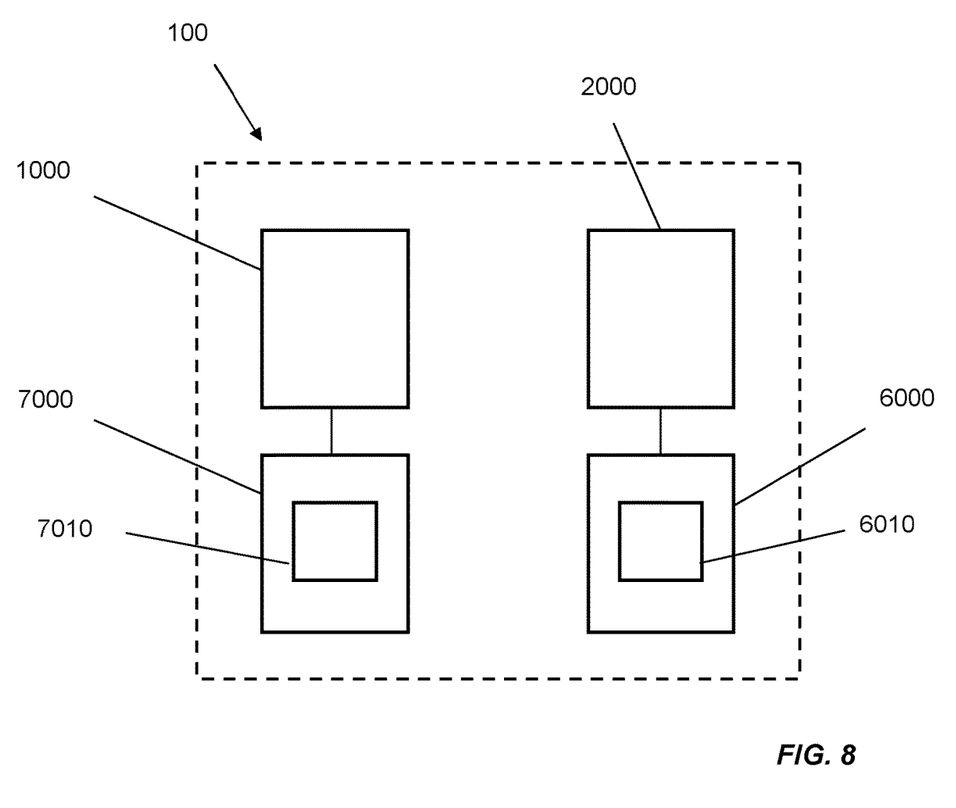
FIG. 8 shows a system further comprising a second transmitter unit and a second receiver unit.

As shown in FIG. 8, in an exemplary embodiment of the system 100, the system 100 further comprises a second transmitter unit 6000 mountable on the UAV 3000.

The second transmitter unit 6000 comprises a transmitter 6010 configured to generate and transmit an air-to-ground signal. In one exemplary embodiment, the air-to-ground signal is a response signal generated and transmitted by the second transmitter unit 6000 in response to the receiver unit 2000 receiving the portion of the combined free-space optical beam. In an exemplary embodiment, the transmitter 6010 is an RF transmitter.

The system 100 further comprises a second receiver unit 7000 comprising a receiver 7010 configured to receive at least a portion of the air-to-ground signal from the second transmitter unit 6000. In an exemplary embodiment, the receiver 7010 is an RF receiver.

Figure 9:
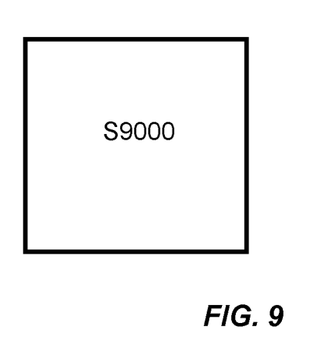
FIGS. 9 and 10 show methods according to the present invention.

Referring to FIG. 9, a method of providing power and data to an unmanned aerial vehicle (UAV) is shown. Step S9000 comprises generating and transmitting, via a free-space optical transmitter, a combined free-space optical beam comprising a power beam and a data beam.

Figure 10:
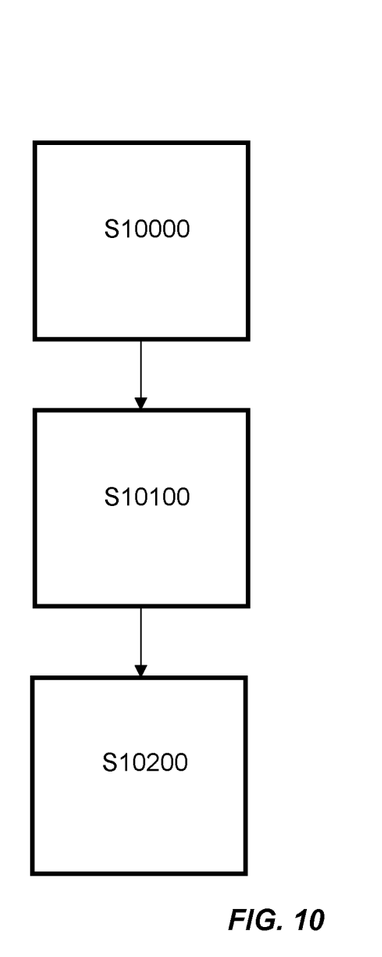

Referring to FIG. 10, a method of receiving power and data at an unmanned aerial vehicle (UAV) is shown. Step S10000 comprises receiving, at an optical receiver, at least a portion of a combined free-space optical beam comprising a power beam and a data beam. Step S10100 comprises converting the received power beam portion into local electrical power; Step S10200 comprises converting the received data beam portion into one or more data signals.

Although a few specific embodiments of the present invention have been shown and described, it will be appreciated by those skilled in the art that various changes and modifications might be made without departing from the scope of the invention, as defined in the appended claims.

The preceding description with reference to the accompanying drawings is provided to assist in a comprehensive understanding of various embodiments of the disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terms and words used in the preceding description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. The terms "front", "rear", "side", "upper", "lower", "over", "under", "inner", "outer" and like terms are used to refer to the apparatus and its components in the orientation in which it is illustrated, which is the orientation in which it is intended to be used but should not be taken as otherwise limiting. Like reference numerals are used to denote like features throughout the figures, which are not to scale.

Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A transmitter unit for providing power and data to an unmanned aerial vehicle (UAV), the transmitter unit comprising:
   a free-space optical transmitter configured to generate and transmit a spatially combined free-space optical beam comprising a power beam of a first wavelength and a data beam of a second wavelength where the first wavelength is different from the second wavelength; and
   a controller for controlling generation and transmission of the spatially combined free-space optical beam by the free-space optical transmitter.

2. A transmitter unit according to claim 1, wherein the power beam has a first bandwidth, and the data beam has a second bandwidth, wherein the second bandwidth is narrower than the first bandwidth.

3. A transmitter unit according to claim 1, wherein the free-space optical transmitter comprises one or more lasers.

4. A receiver unit mountable on an unmanned aerial vehicle (UAV) for receiving power and data at the UAV, the receiver unit comprising:
an optical receiver configured to receive at least a portion of a spatially combined free-space optical beam comprising a power beam of a first wavelength and a data beam of a second wavelength where the first wavelength and the second wavelength are different,
the receiver unit configured to convert the received power beam of the first wavelength into local electrical power and convert the received data beam of the second wavelength into one or more data signals.

5. A receiver unit according to claim 4, wherein the optical receiver comprises a power beam receiver arrangement and a data beam receiver arrangement.

6. A receiver unit according to claim 4, wherein the optical receiver comprises a photovoltaic array comprising a plurality of power beam receiver cells and a plurality of data beam receiver cells.

7. A receiver unit according to claim 6, wherein the receiver unit is configured to convert the received data beam of the second wavelength into a plurality of data signals, the receiver unit further comprising a processor, the processor configured to process the plurality of data signals to provide a processed data signal.

8. A receiver unit according to claim 4, wherein the optical receiver comprises a lens arrangement comprising one or more doped lenses, the doped lenses of the lens arrangement being optionally adjustable to adjust an angle of an optical axis of one or more of the doped lenses relative to the spatially combined free-space optical beam.

9. A system comprising a transmitter unit according to claim 1 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals.

10. A system according to claim 9, wherein the transmitter unit is a first transmitter unit and the receiver unit is a first receiver unit, the system further comprising: a second transmitter unit mountable on the UAV, the second transmitter unit comprising a transmitter configured to generate and transmit an air-to-ground signal; and a second receiver unit, the second receiver unit comprising a receiver configured to receive at least a portion of the air-to-ground signal from the second transmitter unit.

11. A system according to claim 10, wherein the second transmitter unit is configured to transmit an air-to-ground signal comprising one or more of:
information relating to a power storage system mountable on the UAV to store the local electrical power;
network management data; and/or
telemetry data.

12. A receiver unit according to claim 5, wherein the optical receiver comprises a photovoltaic array comprising a plurality of power beam receiver cells and a plurality of data beam receiver cells.

13. A receiver unit according to claim 5, wherein the optical receiver comprises a lens arrangement comprising one or more doped lenses, the doped lenses of the lens arrangement being optionally adjustable to adjust an angle of an optical axis of one or more of the doped lenses relative to the spatially combined free-space optical beam.

14. A system comprising a transmitter unit according to claim 1 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals, wherein the optical receiver comprises a power beam receiver arrangement and a data beam receiver arrangement.

15. A system comprising a transmitter unit according to claim 1 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals, wherein the optical receiver comprises a photovoltaic array comprising a plurality of power beam receiver cells and a plurality of data beam receiver cells.

16. A system according to claim 15, wherein the receiver unit is configured to convert the received data beam of the second wavelength into a plurality of data signals, the receiver unit further comprising a processor, the processor configured to process the plurality of data signals to provide a processed data signal.

17. A system comprising a transmitter unit according to claim 1 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals, wherein the optical receiver comprises a lens arrangement comprising one or more doped lenses, the doped lenses of the lens arrangement being optionally adjustable to adjust an angle of an optical axis of one or more of the doped lenses relative to the spatially combined free-space optical beam.

18. A system comprising a transmitter unit according to claim 2 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals.

19. A system comprising a transmitter unit according to claim 3 and a receiver unit mountable on an unmanned aerial vehicle (UAV) for receiving power and data at the UAV, the receiver unit comprising an optical receiver configured to receive at least a portion of the spatially combined free-space optical beam comprising the power beam of the first wavelength and the data beam of the second wavelength, the receiver unit configured to convert the received power beam of the first wavelength into local electrical power and convert the received data beam of the second wavelength into one or more data signals.

20. A transmitter unit according to claim 1, wherein the power beam concentrically surrounds the data beam.

* * * * *